United States Patent
Ookawa

(10) Patent No.: US 6,894,280 B2
(45) Date of Patent: May 17, 2005

(54) INFRARED CAMERA

(75) Inventor: Norio Ookawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 110 days.

(21) Appl. No.: 10/149,649

(22) PCT Filed: Oct. 15, 2001

(86) PCT No.: PCT/JP01/09038

§ 371 (c)(1),
(2), (4) Date: Jun. 14, 2002

(87) PCT Pub. No.: WO02/33366

PCT Pub. Date: Apr. 25, 2002

(65) Prior Publication Data

US 2002/0179842 A1 Dec. 5, 2002

(51) Int. Cl.[7] .................................. G01J 5/02
(52) U.S. Cl. ..................................... 250/352
(58) Field of Search ......................... 250/352

(56) References Cited

U.S. PATENT DOCUMENTS

| 5,420,419 | A | 5/1995 | Wood |
| 6,288,395 | B1 * | 9/2001 | Kuhnly et al. ......... 250/339.04 |
| 6,444,983 | B1 * | 9/2002 | McManus et al. .......... 250/332 |
| 6,504,155 | B1 | 1/2003 | Ookawa |
| 6,515,285 | B1 * | 2/2003 | Marshall et al. ............ 250/352 |
| 6,630,674 | B2 * | 10/2003 | Knauth et al. .............. 250/352 |

FOREIGN PATENT DOCUMENTS

| JP | 04122823 A | 4/1992 |
| JP | 05332823 A | 12/1993 |
| JP | 05332841 A | 12/1993 |
| JP | 7-509057 A | 10/1995 |
| JP | 08035885 A | 2/1996 |
| JP | 08181916 A | 7/1996 |
| JP | 09304186 A | 11/1997 |
| JP | 10293067 A | 11/1998 |
| JP | 2001-186391 A | 7/2001 |
| WO | WO94/00950 A1 | 1/1994 |

* cited by examiner

Primary Examiner—Constantine Hannaher
(74) Attorney, Agent, or Firm—Burns, Doane, Swecker & Mathis, L.L.P.

(57) ABSTRACT

An infrared camera includes a temperature sensor (39) and an element operating temperature setting circuit (30) for setting a temperature obtained by adding a desired offset to the temperature of the temperature sensor (39) immediately after the power-on as an operating temperature of an imaging device (2), and images with the imaging device (2) settled to the temperature obtained by adding the desired offset to the temperature of the temperature sensor (39) immediately after the power-on.

8 Claims, 5 Drawing Sheets

INFRARED CAMERA

TECHNICAL FIELD

The present invention relates to a non-cooling infrared camera using a heat-type infrared imaging device which operates at room temperature, and more particularly to an infrared camera capable of shortening a start-up time and ensuring low power consumption.

BACKGROUND ART

FIG. 1 is a block diagram showing a configuration of a conventional infrared camera.

Referring to FIG. 1, reference character M denotes a subject, reference numeral 1 an infrared optical system, reference numeral 2 an imaging device located on an focal plane of the infrared optical system 1, reference numeral 3 an element temperature monitor thermally connected to the imaging device 2, reference numerals 4 and 5 bias power supplies, both of which are connected to the imaging device 2, reference numeral 6 a driving circuit connected to the imaging device 2, reference numeral 7 an amplifying/display processing circuit connected to the imaging device 2, reference numeral 8 a thermoelectric device thermally connected to the imaging device 2, reference numeral 9 a constant voltage source, and reference numeral 10 a thermoelectric device driving circuit connected to the element temperature monitor 3, the constant voltage source 9 and the thermoelectric device -8. Reference numeral 11 denotes an element package for packaging therein the imaging device 2, the element temperature monitor 3 and the thermoelectric device 8, and reference numeral 12 an infrared window, which is a part of the element package 11, and through which infrared rays are transmitted. The inside of the element package 11 is kept vacuum, and an exemplary conventional technique on such a packaging method is found in Japanese Patent National Publication No. Hei 7-508384. Reference numeral 13 denotes a timing generator connected to the driving circuit 6 and the amplifying/display processing circuit 7, reference numeral 14 a body of the camera for housing therein these components 2 to 13 and reference numeral 40 a power supply circuit for supplying power required for operations of the respective components.

FIG. 2 is a block diagram showing a configuration of the imaging device 2, and 2×2 pixels are taken as an example for simplification.

Referring to FIG. 2, reference numerals 15 to 18 denote infrared detectors, reference numerals 19 to 22 diodes, reference numeral 23 to 27 transistors, reference numeral 28 a horizontal scanning circuit and reference numeral 29 a vertical scanning circuit. The infrared detectors 15 to 18 are, for example, microbolometers with hollow structure disclosed in Japanese Patent National Publication No. Hei 7-509057.

Now, the operation of the imaging device will be described. When these components are supplied with power by the power supply circuit 40, the thermoelectric device driving circuit 10 supplies the thermoelectric device 8 with power corresponding to the difference between an output of the element temperature monitor 3 and that of the constant voltage source 9 responsible for the setting of the operating temperature of the imaging device 2 to settle the temperature of the imaging device 2 at a constant room temperature. This temperature is usually in a range from 20° to 40° C.

Next, the infrared rays irradiated from the subject M are condensed by the infrared optical system 1, and then form an image on the infrared detectors 15 to 18 after passing through the infrared window 12. This slightly rises the temperatures of the infrared detectors 15 to 18 by about several mK in proportion to the intensity of the infrared rays irradiated from the subject M, and the respective resistance values of the detectors vary on an individual detector basis.

Subsequently, an element driving clock generated by the timing generator 13 is applied to the imaging device 2 from the driving circuit 6. The clock is supplied to the horizontal scanning circuit 28 and the vertical scanning circuit 29, and a current determined depending on the applied voltage of the bias power supply 5 and the characteristics of the transistor 27 is successively supplied to the infrared detectors 15 to 18 from the bias power supply 4 by successively turning on the transistors 23 to 26.

The bias current flows through one selected infrared detector and the transistor 27 into ground due to the presence of the diodes 19 to 22, and a signal corresponding to the resistance value of each infrared detector is outputted as a potential difference between the transistor 27 and the ground. The signal is inputted to the amplifying/display processing circuit 7 and outputted as a video signal.

The conventional infrared camera having been configured as above and it is obligated to operate in the temperature range about from −10° to 50° C. Thus, it takes longer time to settle the temperature of the imaging device 2 to a desired operating temperature as the ambient temperature at the power-on when the power supply circuit 40 starts supplying those components with power departs from the operating temperature set by the constant voltage source 9. This becomes longer the start-up time from the power-on to an image output.

Further, the amount of heat flowing in from or out to the outside through the thermal resistances between the thermoelectric device 8 and the imaging device 2 and between the thermoelectric device 8 and the element package 11 or the thermal resistance by electrical contact between the imaging device 2 and the outside becomes larger. This becomes larger power consumption of the thermoelectric device 8 required to settle the imaging device 2 to a constant temperature.

The present invention has been made to solve the above problems, and it is an object of the present invention to provide an infrared camera with shorter starting time and lower power consumption in a wide range of ambient temperatures by settling the imaging device 2 to a temperature obtained by adding a desired offset to the ambient temperature at power-on and by operating it.

DISCLOSURE OF INVENTION

According to the present invention, an infrared camera includes an infrared optical system, an imaging device located on an focal plane of the infrared optical system, a thermoelectric device thermally connected to the imaging device, an element temperature monitor thermally connected to the imaging device, an element operating temperature setting circuit for setting a temperature obtained by adding a desired offset to the temperature of the element temperature monitor immediately after power-on as an operating temperature of the imaging device, and a thermoelectric device driving circuit for supplying the thermoelectric device with power on the basis of an output of the element operating temperature setting circuit and an output of the element temperature monitor. This provides an infrared camera with shorter start-up time and lower power consumption in a wide range of ambient temperatures.

According to the present invention, an infrared camera includes an infrared optical system, an imaging device located on an focal plane of the infrared optical system, a thermoelectric device thermally connected to the imaging device, an element temperature monitor thermally connected to the imaging device, a temperature sensor provided on a position thermally insulated from the imaging device, an element operating temperature setting circuit for setting a temperature obtained by adding a desired offset to the temperature of the temperature sensor immediately after power-on as an operating temperature of the imaging device, and a thermoelectric device driving circuit for supplying the thermoelectric device with power on the basis of an output of the element operating temperature setting circuit and an output of the element temperature monitor. This provides an infrared camera with shorter start-up time and lower power consumption in a wide range of ambient temperatures without setting the operating temperature of the imaging device higher than it needs even when the power supply is repeatedly turned on and off at short intervals.

BEST MODE FOR CARRYING OUT THE INVENTION

For more detailed description of the present invention, the best mode for carrying out the present invention will be described below, referring to the attached drawings.

First Embodiment

Figure 3:
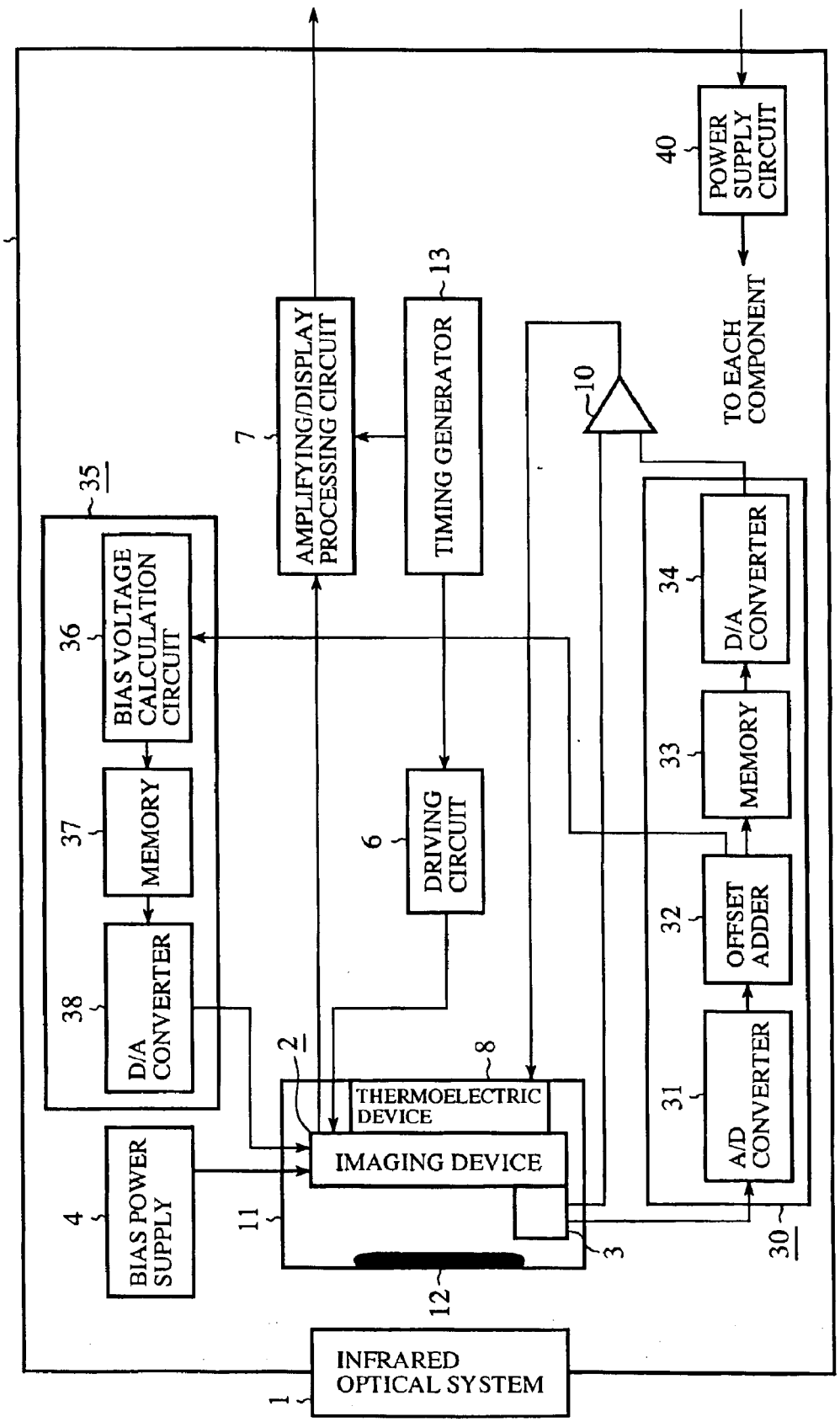
FIG. 3 is a block diagram showing a configuration of an infrared camera according to a first embodiment of the present invention.

FIG. 3 is a block diagram showing a configuration of an infrared camera according to the first embodiment of the present invention.

Figure 1:
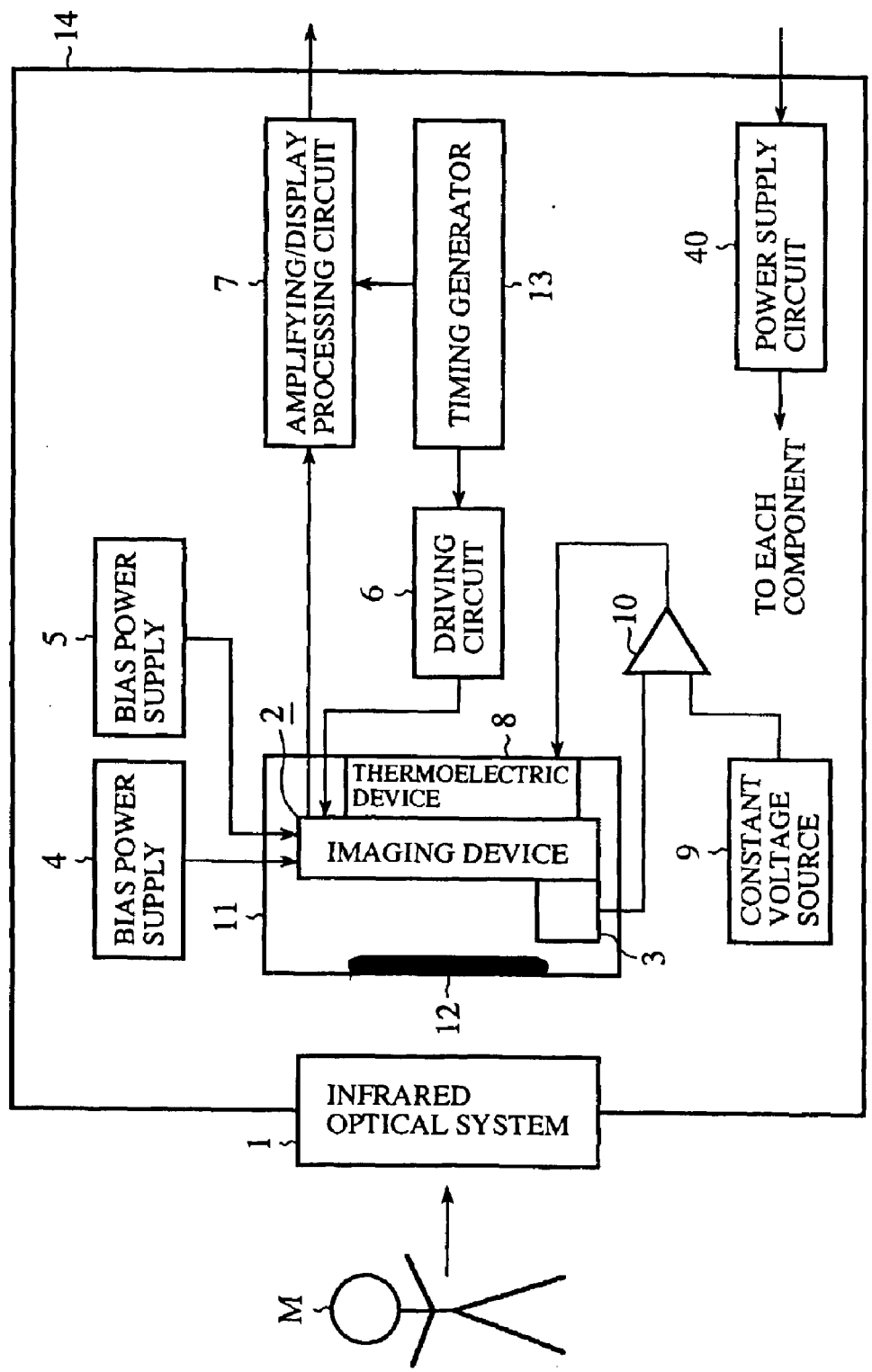
FIG. 1 is a block diagram showing a configuration of a conventional infrared camera.
Figure 2:
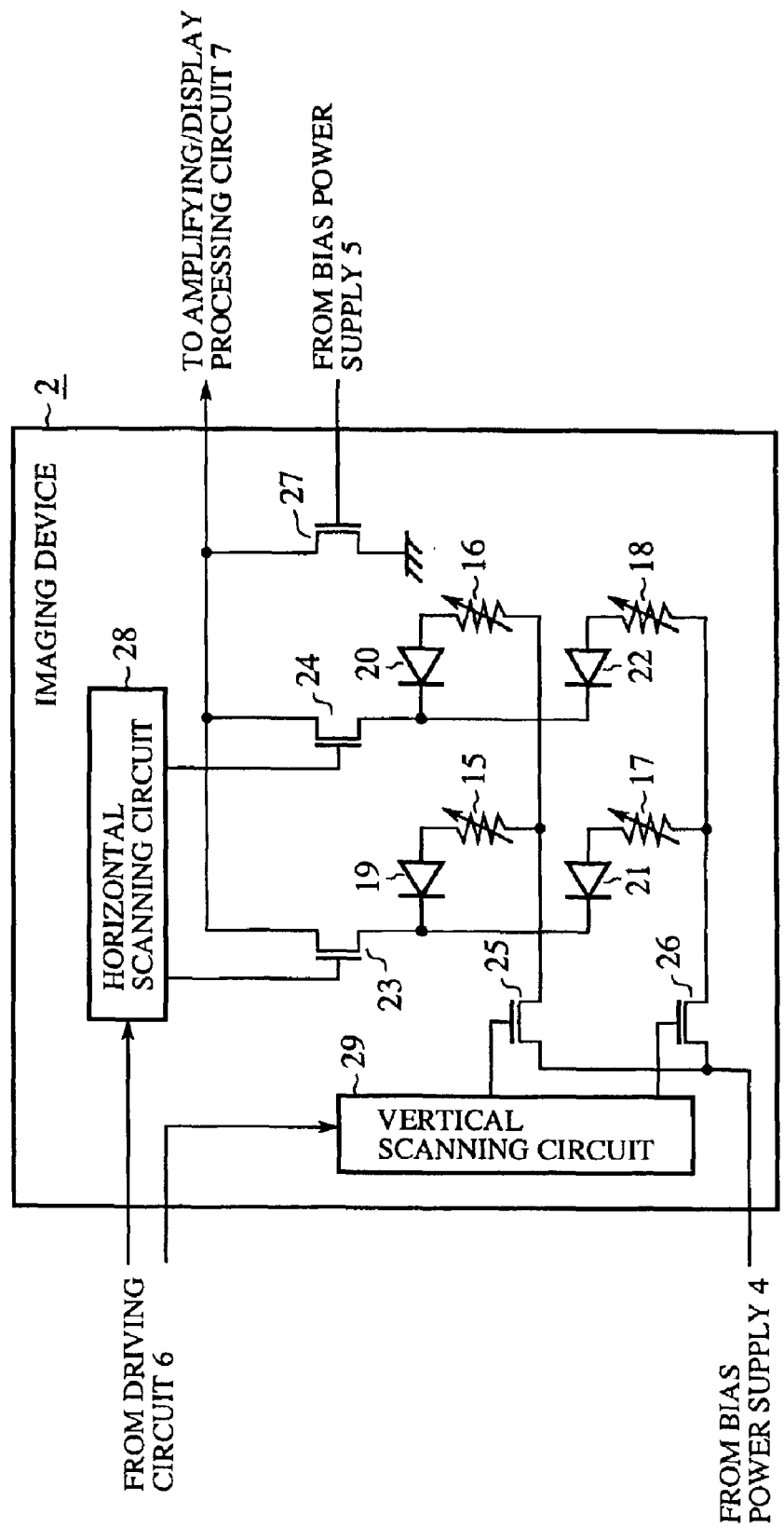
FIG. 2 is a block diagram showing a configuration of an imaging device in the convention infrared camera.

Referring to FIG. 3, reference numeral 1 denotes an infrared optical system, reference numeral 2 an imaging device, reference numeral 3 an element temperature monitor, reference numeral 4 a bias power supply, reference numeral 6 a driving circuit, reference numeral 7 an amplifying/display processing circuit, reference numeral 8 a thermoelectric device, reference numeral 10 a thermoelectric device driving circuit, reference numeral 11 an element package, reference numeral 12 an infrared window, reference numeral 13 a timing generator, reference numeral 14 a body of the camera and reference numeral 40 a power supply circuit. These components are the same as those in the conventional infrared camera shown in FIG. 1. Reference numeral 30 denotes an element operating temperature setting circuit provided between the element temperature monitor 3 and the thermoelectric device driving circuit 10. The element operating temperature setting circuit 30 consists of an A/D converter 31 connected to the element temperature monitor 3, an offset adder 32 connected to the A/D converter 31, a memory 33 connected to the offset adder 32 and a D/A converter 34 connected to the memory 33 and the thermoelectric device driving circuit 10. Reference numeral 35 denotes a variable bias voltage applying circuit connected to the imaging device 2. The variable bias voltage applying circuit 35 consists of a bias voltage calculation circuit 36 connected to the offset adder 32, a memory 37 connected to the bias voltage calculation circuit 36 and a D/A converter 38 connected to the memory 37 and the imaging device 2.

Now, the operation of the infrared camera according to the first embodiment of the present invention will be described. Immediately after power is turned on without supplying the imaging device 2 with the power for settling the bias voltage, the element driving clock and the element temperature, an output of the element temperature monitor 3 is converted from analog to digital by the A/D converter circuit 31. Subsequently, a desired offset ΔT for the measured value is added thereto in the offset adder 32 and the added result is transferred to the memory 33 and the bias voltage calculation circuit 36 in the variable bias voltage applying circuit 35. The memory 33 stores therein the added result of the offset adder 32.

From the viewpoint of minimizing the start-up time, it is desirable that the value of the offset ΔT should be zero. However, considering reduction of power consumption after starting the operation, the offset ΔT for a general monitoring or portable camera is determined to be a positive value, about 10° C. corresponding to a rising temperature in the body of the camera 14.

Figure 4:
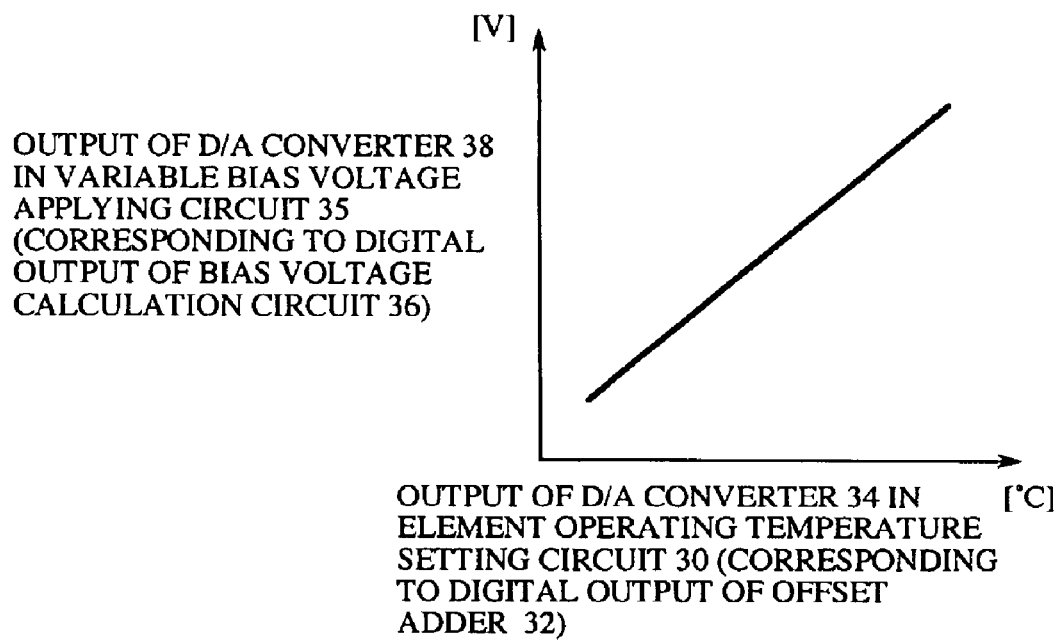
FIG. 4 is a graph showing a relationship between an operating temperature of an imaging device and a bias voltage applied to a transistor according to the first embodiment of the present invention.

FIG. 4 is a graph showing a relationship between an operating temperature of the imaging device 2 and the bias voltage applied to the transistor 27. The bias voltage calculation circuit 36 calculates a bias voltage as shown in FIG. 4 on the basis of the characteristics of the transistor 27 and the output of the offset adder 32, i.e., the set operating temperature of the imaging device 2 and transfers the calculated bias voltage to the memory 37. The memory 37 stores therein the bias voltage.

The D/A converter 38 applies a bias voltage corresponding to the output of the memory 37 to the imaging device 2, setting an output offset voltage of the imaging device 2 to a constant value, regardless of the operating temperature in the range of input voltages of the amplifying/display processing circuit 7. Subsequently, the element driving clock is applied to the imaging device 2 from the timing generator 13 through the driving circuit 6.

Next, the output of the memory 33 is converted from digital to analog in the D/A converter 34 and transferred to the thermoelectric device driving circuit 10. The thermoelectric device driving circuit 10 supplies the thermoelectric device 8 with power so that the temperature of the imaging device 2 comes to the temperature set by the element operating temperature setting circuit 30.

Thus, an imaging operation is started with the imaging device 2 settled to the temperature obtained by adding the desired offset to the temperature of the element temperature monitor 3 immediately after the power-on. Although the value of the offset ΔT used in the offset adder 32 for addition is generally determined to a positive value, about 10° C., for a monitoring or portable camera as discussed above, it may be zero when top priority is assigned to reduction in start-up time, or it may be a negative value when low-temperature ambient should be implemented immediately after the start-up. Other operation is the same as that of the conventional infrared camera, and description thereof is omitted.

Second Embodiment

Figure 5:
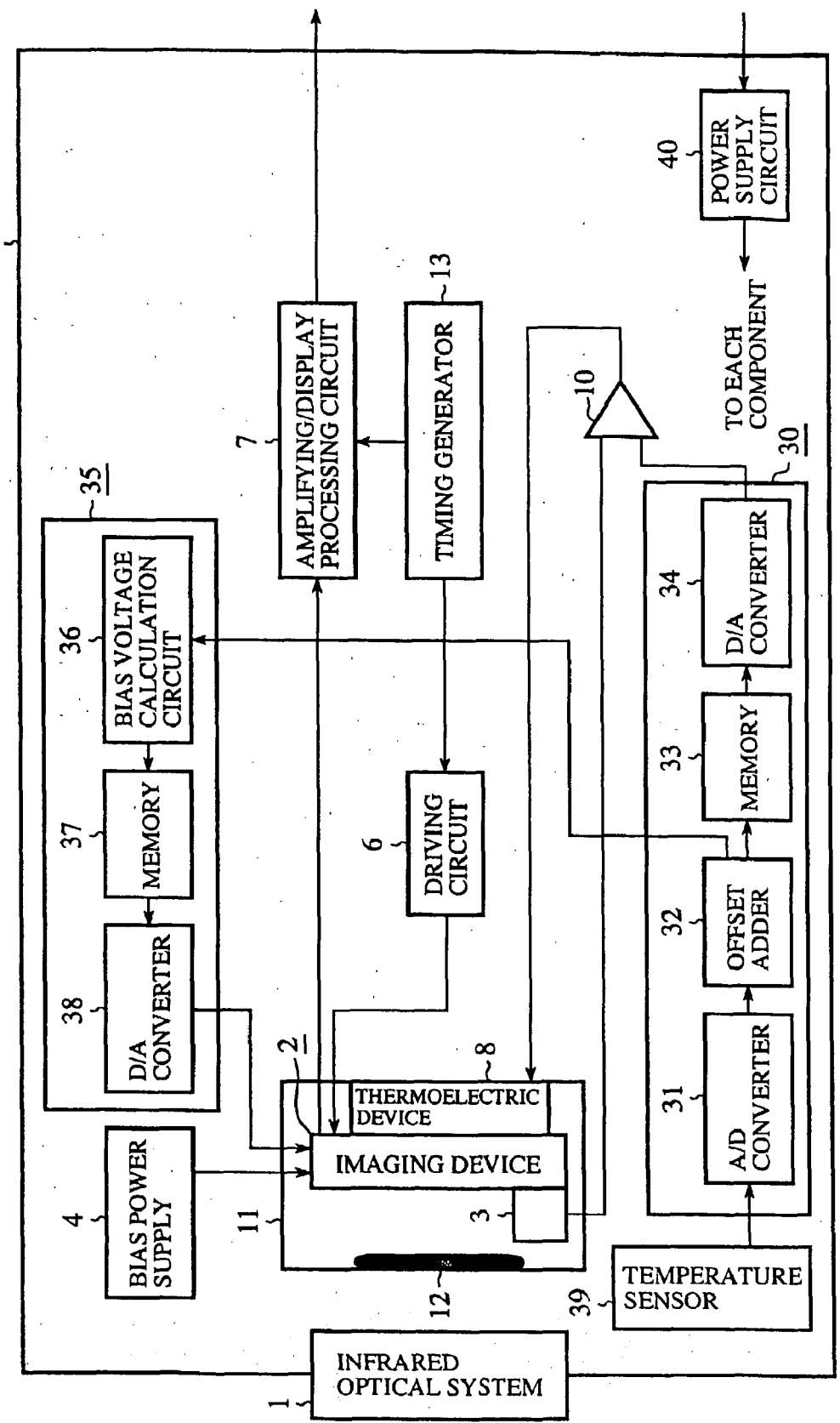
FIG. 5 is a block diagram showing a configuration of an infrared camera according to a second embodiment of the present invention.

FIG. 5 is a block diagram showing a configuration of an infrared camera according to the second embodiment of the present invention. In FIG. 5, the components represented by reference numerals 1 to 4, 6 to 8, 10 to 14 and 40 are the same as those in the conventional infrared camera shown in FIG. 1 and the infrared camera of the first embodiment shown in FIG. 3. Further, the components represented by reference numerals 30 to 38 are the same as those in the infrared camera of the first embodiment shown in FIG. 3.

Reference numeral 39 denotes a temperature sensor which is provided on a position thermally insulated from the imaging device 2.

Now, the operation of the infrared camera according to the second embodiment of the present invention will be described. Immediately after power is turned on without supplying the imaging device 2 with the power for settling the bias voltage, the element driving clock and the element temperature, an output of the temperature sensor 39 is converted from analog to digital by the A/D converter 31.

Subsequently, a desired offset for the measured temperature is added thereto in the offset adder 32 and the added result is transferred to the memory 33 and the bias voltage-calculation circuit 36 in the variable bias voltage applying circuit 35. Thus, an imaging operation is started with the imaging device 2 settled to the temperature obtained by adding the desired offset to the temperature of the temperature sensor 39 immediately after the power-on. Other operation is the same as that of the infrared camera in the first embodiment.

The above operation makes possible to perform an imaging operation without setting the operating temperature of the imaging device 2 higher than it needs even when the power supply is repeatedly turned on and off at intervals of time shorter than the time required for the temperatures of the imaging device 2 and the element temperature monitor 3 becomes equal to the ambient temperature of the element package 11.

INDUSTRIAL APPLICABILITY

Thus, the infrared camera according to the present invention is suitable for starting up in a short time and perform an infrared imaging operation with low power consumption in a wide range of ambient temperatures.

What is claimed is:

1. An infrared camera comprising:
   an infrared optical system;
   an imaging device located on an focal plane of said infrared optical system;
   a thermoelectric device thermally connected to said imaging device;
   an element temperature monitor thermally connected to said imaging device;
   an element operating temperature setting circuit for setting a temperature obtained by adding a desired offset to the temperature of said element temperature monitor immediately after power-on as an operating temperature of said imaging device;
   a thermoelectric device driving circuit for supplying said thermoelectric device with power such that an output of said element temperature monitor is settled to an output of said element operating temperature setting circuit; and
   a variable bias voltage applying circuit for setting a bias voltage, immediately after power-on, to be applied to said imaging device in correspondence with the operating temperature output by said element operating temperature setting circuit.

2. The infrared camera according to claim 1, further comprising:
   an element package for packaging therein said imaging device, said thermoelectric device and said element temperature monitor.

3. The infrared camera according to claim 1, wherein said element operating temperature setting circuit comprises:
   an A/D converter connected to said element temperature monitor;
   an offset adder connected to said A/D converter;
   a memory connected to said offset adder; and
   a D/A converter connected to said memory.

4. The infrared camera according to claim 1, wherein said variable bias voltage applying circuit comprises:
   a bias voltage calculation circuit connected to said element operating temperature setting circuit;
   a memory connected to said bias voltage calculation circuit; and
   a D/A converter connected to said imaging device and said memory.

5. An infrared camera comprising:
   an infrared optical system;
   an imaging device located on a focal plane of said infrared optical system;
   a thermoelectric device thermally connected to said imaging device;
   an element temperature monitor thermally connected to said imaging device;
   a temperature sensor provided on a position thermally insulated from said imaging device;
   an element operating temperature setting circuit for setting a temperature obtained by adding a desired offset to the temperature of said temperature sensor immediately after power-on as an operating temperature of said imaging device;
   a thermoelectric device driving circuit for supplying said thermoelectric device with power such that an output of said element temperature monitor is settled to an output of said element operating temperature setting circuit; and
   a variable bias voltage applying circuit for setting a bias voltage, immediately after power-on, to be applied to said imaging device in correspondence with the operating temperature output by said element operating temperature setting circuit.

6. The infrared camera according to claim 5, further comprising:
   an element package for packaging therein said imaging device, said thermoelectric device and said element temperature monitor.

7. The infrared camera according to claim 5, wherein said element operating temperature setting circuit comprises:
   an A/D converter connected to said temperature sensor;
   an offset adder connected to said ND converter;
   a memory connected to said offset adder; and
   a D/A converter connected to said memory.

8. The infrared camera according to claim 5, wherein said variable bias voltage applying circuit comprises:
   a bias voltage calculation circuit connected to said element operating temperature setting circuit;
   a memory connected to said bias voltage calculation circuit; and
   a D/A converter connected to said imaging device and said memory.

* * * * *

UNITED STATES PATENT AND TRADEMARK OFFICE
CERTIFICATE OF CORRECTION

PATENT NO.    : 6,894,280 B2  
DATED         : May 17, 2005  
INVENTOR(S)   : Norio Ookawa It is certified that error appears in the above-identified patent and that said Letters Patent is hereby corrected as shown below:

Title page,
Item [30], Foreign Application Priority Data, add -- October 16, 2000 (JP) 2000-315175 --.

Signed and Sealed this

Fourth Day of October, 2005

JON W. DUDAS
*Director of the United States Patent and Trademark Office*

UNITED STATES PATENT AND TRADEMARK OFFICE
CERTIFICATE OF CORRECTION

PATENT NO.    : 6,894,280 B2
DATED         : May 17, 2005
INVENTOR(S)   : Norio Ookawa It is certified that error appears in the above-identified patent and that said Letters Patent is hereby corrected as shown below:

Column 6,
Line 51, delete "ND converter" and insert -- A/D converter --.

Signed and Sealed this

Fifteenth Day of November, 2005

JON W. DUDAS
*Director of the United States Patent and Trademark Office*